United States Patent
Chen et al.

(10) Patent No.: US 12,145,643 B2
(45) Date of Patent: Nov. 19, 2024

(54) CTC3.0-BASED LOCOMOTIVE DECOUPLING AND COUPLING PLAN AUTOMATIC GENERATION AND EXECUTION METHOD

(71) Applicant: CASCO SIGNAL LTD., Shanghai (CN)

(72) Inventors: Xuan Chen, Shanghai (CN); Huarong Li, Shanghai (CN); Jiannian Wang, Shanghai (CN); Yingtao Lu, Shanghai (CN); Zhenjie Chen, Shanghai (CN); Dejun Chen, Shanghai (CN); Zheng You, Shanghai (CN); Yangjie Zhao, Shanghai (CN)

(73) Assignee: CASCO SIGNAL LTD., Shanghai (CN)

( * ) Notice: Subject to any disclaimer, the term of this patent is extended or adjusted under 35 U.S.C. 154(b) by 0 days.

(21) Appl. No.: 18/016,358

(22) PCT Filed: Nov. 4, 2021

(86) PCT No.: PCT/CN2021/128600
§ 371 (c)(1),
(2) Date: Jan. 16, 2023

(87) PCT Pub. No.: WO2023/015746
PCT Pub. Date: Feb. 16, 2023

(65) Prior Publication Data
US 2024/0067240 A1    Feb. 29, 2024

(30) Foreign Application Priority Data
Aug. 13, 2021 (CN) .......................... 202110930059.0

(51) Int. Cl.
| | |
|---|---|
| *B61L 27/20* | (2022.01) |
| *B61L 27/00* | (2022.01) |
| *B61L 27/04* | (2006.01) |
| *B61L 27/16* | (2022.01) |

(52) U.S. Cl.
CPC ............... *B61L 27/04* (2013.01); *B61L 27/16* (2022.01)

(58) Field of Classification Search
CPC ................................. B61L 27/20; B61L 27/00
See application file for complete search history.

(56) References Cited

U.S. PATENT DOCUMENTS

| | | | | |
|---|---|---|---|---|
| 2006/0074544 | A1* | 4/2006 | Morariu | B61L 27/16 701/19 |
| 2015/0108284 | A1* | 4/2015 | Pirtle | B61L 23/06 246/4 |
| 2015/0291193 | A1* | 10/2015 | Perras | G01S 19/14 246/122 R |

(Continued)

*Primary Examiner* — Long T Tran
(74) *Attorney, Agent, or Firm* — JCIPRNET

(57) ABSTRACT

The invention relates to a CTC3.0-based locomotive decoupling and coupling plan automatic generation and execution method. According to the method, by upgrading a track occupancy display terminal and a data platform in a CTC3.0 system, automatic generation of a locomotive decoupling or coupling plan is triggered when the route display terminal receives a train plan, so as to complete a locomotive decoupling or coupling task. The method has the advantages of high automation degree and high transportation efficiency.

10 Claims, 2 Drawing Sheets

(56) References Cited

U.S. PATENT DOCUMENTS

| | | | |
|---|---|---|---|
| 2016/0200327 A1* | 7/2016 | Liu | B61L 25/02 |
| | | | 705/13 |
| 2022/0055671 A1* | 2/2022 | Shifman | H04L 63/1416 |
| 2022/0182179 A1* | 6/2022 | Ghazi-Moghadam | |
| | | | H04L 25/067 |
| 2022/0185350 A1* | 6/2022 | Kindt | B61L 1/18 |
| 2022/0201587 A1* | 6/2022 | Edmondson | B61L 15/0054 |

* cited by examiner

CTC3.0-BASED LOCOMOTIVE DECOUPLING AND COUPLING PLAN AUTOMATIC GENERATION AND EXECUTION METHOD

CROSS-REFERENCE TO RELATED APPLICATION

This application is a 371 of international application of PCT application serial no. PCT/CN2021/128600, filed on Nov. 4, 2021, which claims the priority benefit of China application no. 202110930059.0, filed on Aug. 13, 2021. The entirety of each of the above mentioned patent applications is hereby incorporated by reference herein and made a part of this specification.

BACKGROUND OF THE INVENTION

1. Technical Field

The invention relates to the field of locomotive coupling and decoupling for rail traffic, and particularly relates to a CTC3.0-based locomotive decoupling and coupling plan automatic generation and execution method.

2. Description of Related Art

Locomotive decoupling and coupling refer to the task of detaching the traction locomotive from one carriage or attaching the traction locomotive to one carriage, and is a piece of common work for busy ordinary-speed junction stations. In this scene, passengers and locomotives will be adjusted and changed at the stations, and is a complex technical task of the stations.

The existing CTC3.0 system-based locomotive decoupling and coupling technique is the latest locomotive decoupling and coupling technique, which adds a locomotive decoupling and coupling functional module based on the existing CTC3.0 system, and fulfills the locomotive decoupling and coupling function based on original information in the CTC3.0 system, such as plans, operation procedures and route conditions. According to interlock route information, a locomotive entry and exit scheduling condition is designed to serve as the planning basis, intrinsically associated information between the locomotive and the train number is mined according to planned number information of trains, line information of locomotive entry and exit, and signal or track occupation, and a locomotive decoupling or coupling plan is generated through manual scheduling.

With the expansion of the road network and the increase of the rate of traffic flow, the transportation organization work of stations is becoming ever heavier, and the scheme of manual planning of locomotive decoupling or coupling along relatively fixed running tracks for each train can no longer meet the requirements for working efficiency of the stations.

Upon search, Chinese Invention Patent CN109591858A discloses a CTC3.0 system-based locomotive change handling method and device. According to the invention, a locomotive decoupling and coupling functional module is added based on the CTC3.0 system, and the locomotive decoupling and coupling function is fulfilled based on original information in the CTC3.0 system, such as plans, operation procedures and route conditions; according to interlock route information, a locomotive entry and exit scheduling condition is designed to serve as the planning basis, and intrinsically associated information between the locomotive and the train number is mined according to planned number information of trains, line information of locomotive entry and exit, and signal or track occupation, such that a locomotive decoupling or coupling plan can be figured out, and locomotive decoupling or coupling routes are handled according to the locomotive decoupling or coupling plan. However, when the method and device provided by the invention are used for scheduling locomotive decoupling or coupling tasks, parameters relating to the task type, the operation direction and exit information need to be ticked manually, which introduces manual intervention, compromising the decoupling and coupling efficiency of stations.

BRIEF SUMMARY OF THE INVENTION

The objective of the invention is to overcome the defects of the prior art by providing CTC3.0-based locomotive decoupling and coupling plan automatic generation and execution method, which is high in automation degree and efficiency.

The objective of the invention may be fulfilled through the following technical solution:

In a first aspect, the invention provides a CTC3.0-based locomotive decoupling and coupling plan automatic generation and execution method. According to the CTC3.0-based locomotive decoupling and coupling plan automatic generation and execution method, by upgrading a track occupancy display terminal and a data platform in a CTC3.0 system, automatic generation of a locomotive decoupling or coupling plan is triggered when the route display terminal receives a train plan, so as to complete a locomotive decoupling or coupling task;

The CTC3.0-based locomotive decoupling and coupling plan automatic generation and execution method specifically comprises the following steps:

Step S1: automatically generating a locomotive decoupling or coupling plan;

Step S2: generating a locomotive decoupling or coupling operation sequence according to the locomotive decoupling or coupling plan, and clicking the locomotive decoupling or coupling operation sequence by means of the track occupancy display terminal to display a route preview of a corresponding station;

Step S3: after the route preview appears, sending a shunting route to be handled to an autonomous machine, and checking whether there is a conflict between the autonomous machine and the train plan; if not, sending route information to an interlocking system to be executed; if so, modifying a shunting plan, or handling the shunting route after the train route is executed; and Step S4: sending approved shunting route information to the interlocking system through the autonomous machine, and completing route shunting by the interlocking system.

Preferably, the Step S1 specifically comprises the following sub-steps:

Step S101: issuing a center train stage plan to the station through a CTC working diagram;

Step S102: receiving, by the track occupancy display terminal, the stage plan issued by a center server;

Step S103: determining, by the track occupancy display terminal, whether the train plan is a passing-by plan according to the received stage plan; if the train plan is the passing-by plan, not generating a locomotive decoupling or coupling shunting plan; if the train plan is a final destination plan, a starting plan or a starting-by-time plan, checking, by the track occupancy display terminal, whether a train exists in a basic locomotive diagram; if so, performing the S104; otherwise, ending the process;

Step S104: in the case where the train plan is not the passing-by plan, if it is checked by the track occupancy display terminal that the train exists in the basic locomotive diagram, defining a decoupling or coupling type of the train according to the basic locomotive diagram, and automatically generating a corresponding decoupling or coupling plan; if it is checked by the track occupancy display terminal that the train does not exist in the basic locomotive diagram, not generating a locomotive decoupling or coupling plan;

Step S105: if the train in the basic locomotive diagram is of the decoupling type, automatically generating a locomotive decoupling plan according to the train plan and the basic locomotive diagram, and automatically generating a shunting route sequence in combination with a shunting configuration;

Step S106: clicking the shunting route sequence by means of the track occupancy display terminal to handle a shunting route for locomotive decoupling;

Step S107: if the train in the basic locomotive diagram is of a coupling type, automatically generating a locomotive coupling plan according to the train plan and the basic locomotive diagram, and automatically generating a shunting route sequence in combination with a shunting configuration; and Step S108: clicking the shunting route sequence by means of the track occupancy display terminal to handle a shunting route for locomotive coupling.

Preferably, the Step S102 specifically comprises: issuing, by a center plan, the stage plan to the autonomous machine of the station, and transmitting, by the autonomous machine of the station, the stage plan to the track occupancy display terminal.

Preferably, the basic locomotive diagram in the Step S104 comprises store a train number, a decoupling or coupling attribute of the train, a route passed by, and target entry or exit track information, and the stored train number is consistent with the number of a train to be subjected to locomotive decoupling or coupling in the train plan.

Preferably, the basic locomotive diagram is maintained through a data platform; when a locomotive to be decoupled or coupled changes, the basic locomotive diagram is updated to the track occupancy display terminal, and a new locomotive decoupling or coupling plan is automatically generated in a system.

Preferably, the shunting configuration in the Step S105 is maintained through a data platform, and the track occupancy display terminal generates the shunting route for locomotive decoupling by means of the decoupling shunting plan and the shunting configuration.

Preferably, the shunting configuration in the Step S107 is maintained through the data platform, and the track occupancy display terminal generates the shunting route for locomotive coupling by means of the coupling shunting plan and the shunting configuration.

Preferably, in the Step S2, the route preview is displayed by reading CAD data of the station by the track occupancy display terminal, displaying a static station image, and then displaying a white light strip composed of devices corresponding to the route to be handled according to the received decoupling or computing route information and station devices included by each route in a route table.

Preferably, the conflict check in the Step S3 is existing safety check of CTC3.0; if the autonomous machine and the train plan pass the conflict check, a train route and the shunting route are parallel routes, and the shunting route is handled directly; and if the autonomous machine and the train plan fail to pass the conflict check, the shunting route will not be handled.

In a second aspect, the invention provides an electronic device comprises a memory having a computer program stored therein, and a processor, wherein the processor executes the computer program to implement the method mentioned above.

Compared with the prior art, the invention has the following advantages:

(1) According to the CTC3.0-based locomotive decoupling and coupling plan automatic generation and execution method designed by the invention, by upgrading the track occupancy display terminal and the data platform based on the existing CTC3.0 system, a locomotive decoupling or coupling plan can be generated automatically;

(2) In the invention, the data platform is designed to maintain the basic locomotive diagram, and when a locomotive to be decoupled or coupled changes, the basic locomotive diagram can be updated to automatically generate a new locomotive decoupling or coupling plan in a system;

(3) In the invention, the automatic generation of a locomotive decoupling or coupling plan is triggered when the route display terminal receives a train plan, so compared with the locomotive functions of the existing CTC3.0 system, the operation procedures of manual handling of locomotive decoupling or coupling tasks are simplified, and the automation degree of stations is improved, thus improving the transportation efficiency of the stations;

(4) Data and information in the invention are from true CTC data, thus having practical improvement effects on transportation work of the stations.

DETAILED DESCRIPTION OF THE INVENTION

The technical solutions of the embodiments of the invention will be clearly and completely described below in conjunction with the drawings of these embodiments. Clearly, the embodiments in the following description are merely illustrative ones, and are not all possible ones of the invention. All other embodiments obtained by those ordinarily skilled in the art according to the following ones without creative labor should also fall within the protection scope of the invention.

Figure 1:
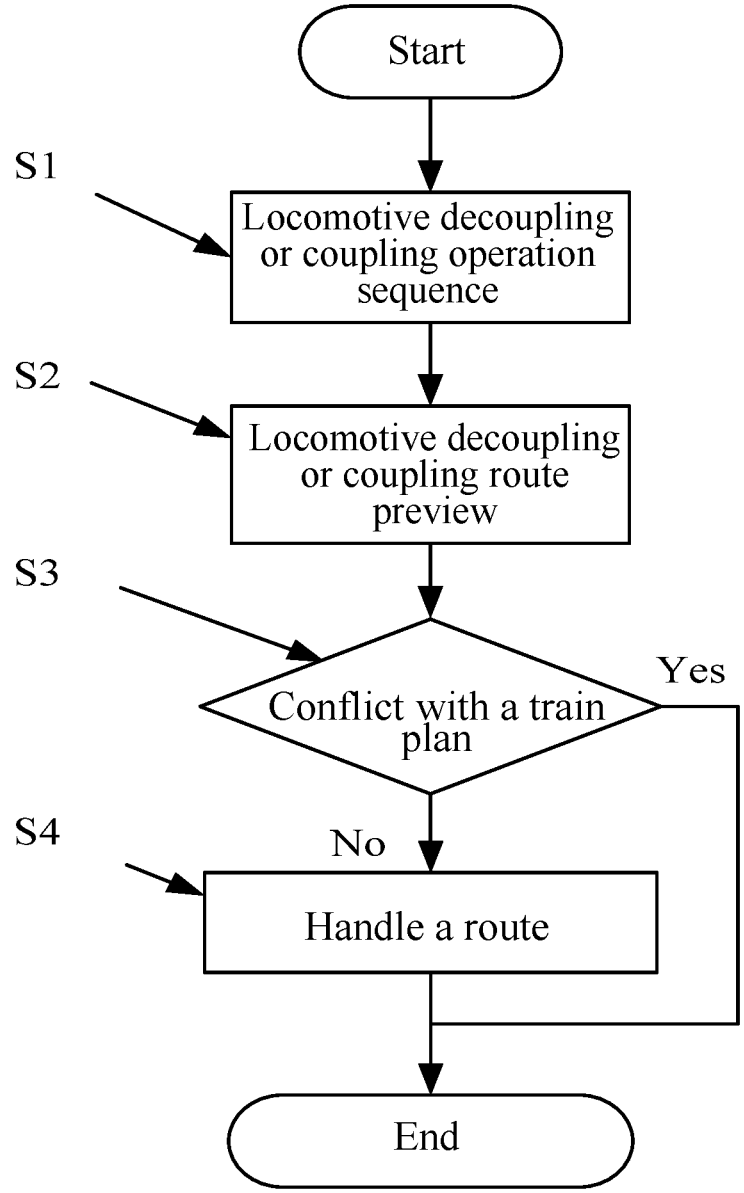
FIG. 1 is a flow diagram of automatic generation of a locomotive decupling or coupling plan.
Figure 2:
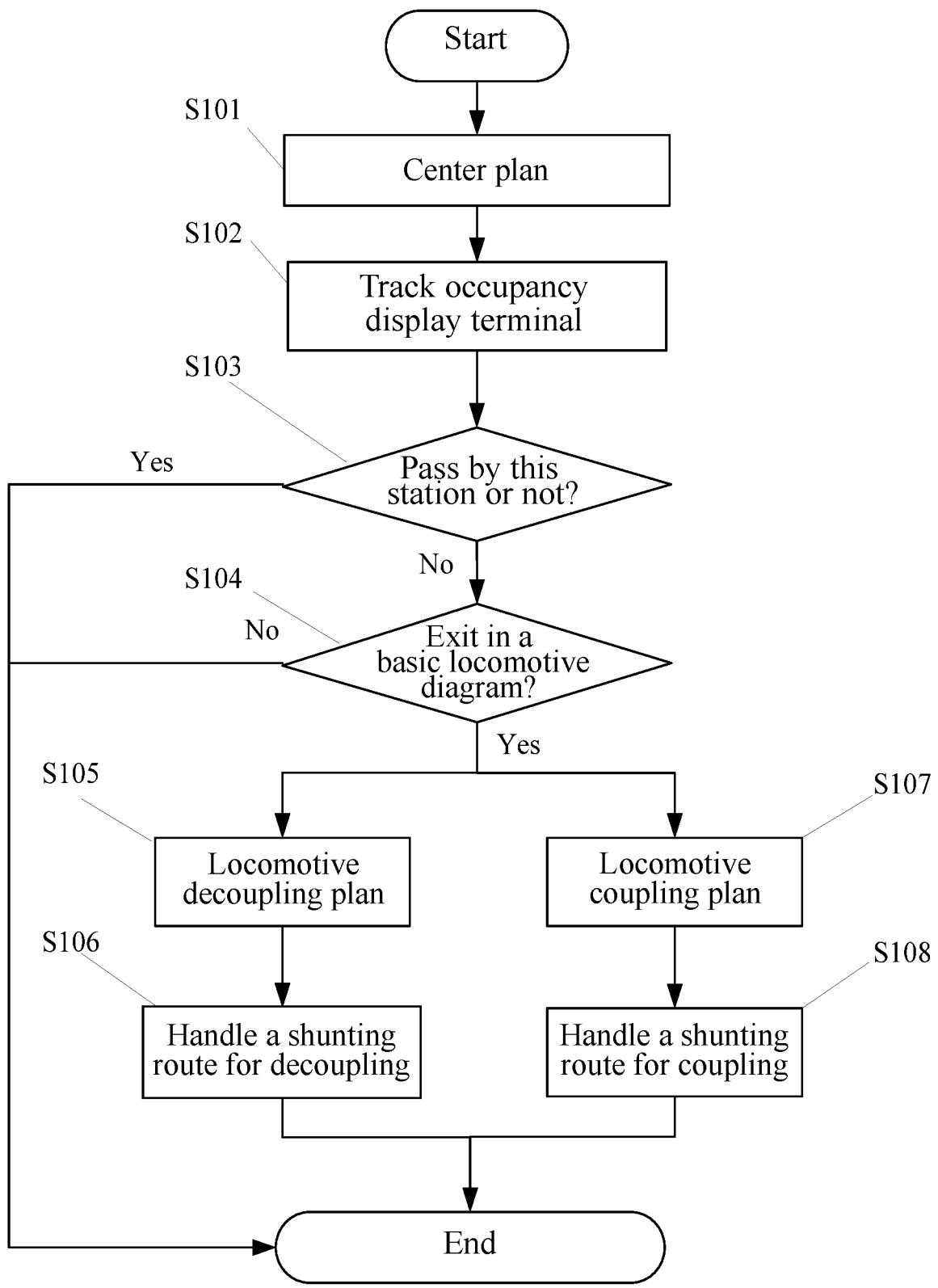
FIG. 2 illustrates an execution process of a locomotive decoupling or coupling task.

The invention relates to a CTC3.0-based locomotive decoupling and coupling plan automatic generation and execution method. According to the CTC3.0-based locomotive decoupling and coupling plan automatic generation and execution method, by upgrading a track occupancy display terminal and a data platform in a CTC3.0 system, automatic generation of a locomotive decoupling or coupling plan is triggered when the route display terminal receives a train plan, so as to complete a locomotive decoupling or coupling task; a data platform is designed to maintain a basic locomotive diagram, and when a locomotive to be decoupled or coupled changes, the basic locomotive diagram is updated to automatically generate a locomotive decoupling or coupling plan in a system; as shown in FIG. 1 which illustrates an execution process of a locomotive decoupling or coupling task, the CTC3.0-based locomotive decoupling and coupling plan automatic generation and execution method specifically comprises the following steps:

Step S1: a locomotive decoupling or coupling operation sequence is automatically generated by a locomotive decoupling or coupling operation sheet;

As shown in FIG. 2, the Step S1 comprises the following sub-steps:

Step S101: a center train stage plan is issued to a station through a CTC working diagram;

Step S102: the stage plan is issued to an autonomous machine of the station by a center plan, and is transmitted by the autonomous machine of the station to a CTC3.0 track occupancy display terminal;

Step S103: the CTC3.0 track occupancy display terminal determines whether the train plan is a passing-by plan according to the received stage plan; if the train plan is the passing-by plan, no locomotive decoupling or coupling shunting plan will be generated; if the train plan is a final destination plan, a starting plan or a starting-by-time plan, the track occupancy display terminal checks whether a train exists in a basic locomotive diagram;

Step S104: in the case where the train plan is not the passing-by plan, if it is checked by the track occupancy display terminal that the train exists in the basic locomotive diagram, a decoupling or coupling type of the train is defined according to the basic locomotive diagram, and a corresponding decoupling or coupling plan is generated automatically; if it is checked by the track occupancy display terminal that the train does not exist in the basic locomotive diagram, no locomotive decoupling or coupling plan will be generated; wherein, the basic locomotive diagram is stored in a CTC3.0 data platform, comprises store a train number, a decoupling or coupling attribute of the train, a route passed by, and target entry or exit track information and can be updated to the track occupancy display terminal to be used, the stored train number in the basic locomotive diagram is consistent with the number of a train to be subjected to locomotive decoupling or coupling in the train plan, and the basic locomotive diagram is maintained and updated by personnel at the station through the CTC3.0 data platform;

Step S105: if the train in the basic locomotive diagram is of the decoupling type, a locomotive decoupling plan is automatically generated according to the train plan and the basic locomotive diagram, and a shunting route sequence is automatically generated in combination with a shunting configuration; wherein, the shunting configuration is maintained through the CTC3.0 data platform, and the CTC3.0 track occupancy display terminal generates a shunting route for locomotive decoupling of the decoupling shunting plan and the shunting configuration;

Step S106: an operator clicks the shunting route sequence by means of the track occupancy display terminal to handle a shunting route for locomotive decoupling;

Step S107: if the train in the basic locomotive diagram is of a coupling type, a locomotive coupling plan is automatically generated according to the train plan and the basic locomotive diagram, and a shunting route sequence is automatically generated in combination with a shunting configuration, wherein the shunting configuration is maintained through the CTC3.0 data platform, and the CTC3.0 track occupancy display terminal generates the shunting route for locomotive coupling by means of the coupling shunting plan and the shunting configuration; and Step S108: the operator clicks the shunting route sequence by means of the track occupancy display terminal to handle a shunting route for locomotive coupling.

For each train in the train plan, the Steps S101-S108 are performed repeatedly until all locomotive change plans are generated to execute a corresponding task.

Step S2: a locomotive decoupling or coupling route preview is displayed by reading CAD data of the station by the track occupancy display terminal, displaying a static station image, and then displaying a white light strip composed of devices corresponding to the route to be handled according to received decoupling or computing route information and station devices included by each route in a route table.

Step S3: after the route preview appears, a shunting route to be handled is sent to the autonomous machine, and whether there is a conflict between the autonomous machine and the train plan is checked; if not, route information is sent to an interlocking system to be executed; if so, the shunting plan is modified, or the shunting route is handled after the train route is executed; wherein the check of the shunting route performed by the autonomous machine and the route of the train is existing safety check of CTC3.0; if the autonomous machine and the train plan pass the check, the train route and the shunting route are parallel routes, and the shunting route is handled directly; and if the autonomous machine and the train plan fail to pass the check, the shunting route will not be handled.

Step S4: approved shunting route information is sent to the interlocking system through the autonomous machine, and route shunting is completed by the interlocking system.

For each train, the Steps S1-S4 are performed repeatedly to complete a corresponding locomotive decoupling or coupling task.

The invention further discloses an electronic device comprising a central processing unit (CPU), which can execute various proper motions and processing operations according to a computer program instruction stored in a read-only memory (ROM) or a computer program instruction loaded into a random access memory (RAM) from a storage unit. Various programs and data required for device operations can also be stored in the RAM. The CPU, the ROM and the RAM are connected through a bus. An input-output (I/O) interface is connected to the bus.

Multiple components, including an input unit such as a keyboard or a mouse, an output unit such as various displays and speakers, a storage unit such as a magnetic disk or a CD, and a communication unit such as a network card, a modem and a wireless communication transceiver, in the device are connected to the I/O interface. The communication unit allows the device to exchange information/data with other devices through a computer network such as the Internet and/or various telecommunication networks.

The CPU executes various methods and processing operations described above, such as the Steps S1-S4 and S101-S108 of the method. For example, in some embodiments, the Steps S1-S4 and S101-S108 of method can be implemented as a computer software program, and is tangibly included in a machine-readable medium such as the storage unit. In some embodiments, all or part of the computer program is loaded and/or installed on the device through the ROM and/or the communication unit. When the computer program is loaded to the RAM and executed by the CPU, one or more of the steps S1-S4 and S101-S108 of the method can be performed. Alternatively, in other embodiments, the CPU may be configured to implement the Steps S1-S4 and S101-S108 of method in other any appropriate ways (such as by means of firmware).

At least part of the functions described above can be implemented by one or more hardware logic components. For example, illustrative hardware logic components may non-restrictively include: a field programmable gate array (FPGA), an application specific integrated circuit (ASIC), an application specific standard product (ASSP), a system on chip (SOC), a complex programmable logic device (CPLD), and the like.

Program codes used for implementing the method of the invention may be written in any combination of one or more programming languages. These program codes may be provided to a processor or controller of a general purpose computer, a specific purpose computer, or other programmable data processing devices, such that when the program codes are executed by the processor or controller, the functions/operations specified in the flow program and/or block diagram are implemented. These program codes may be entirely or partially executed on a machine, and, as independent software packages, or are partially executed on the machine and partially executed on a remote machine, or are completely executed on a remote machine or server.

The above embodiments are merely specific ones of the invention, and the protection scope of the invention is not limited to these embodiments. All equivalent modifications or substitutions that can be easily obtained by any skilled in the art within the technical scope of the invention should fall within the protection scope of the invention. Therefore, the protection scope of the invention should be subject to the protection scope of the claims.

What is claimed is:

1. A CTC3.0-based locomotive decoupling and coupling plan automatic generation and execution method, wherein by upgrading a track occupancy display terminal and a data platform in a CTC3.0 system, automatic generation of a locomotive decoupling or coupling plan is triggered when the route display terminal receives a train plan, so as to complete a locomotive decoupling or coupling task;

the CTC3.0-based locomotive decoupling and coupling plan automatic generation and execution method specifically comprises the following steps:

Step S1: automatically generating a locomotive decoupling or coupling plan;

Step S2: generating a locomotive decoupling or coupling operation sequence according to the locomotive decoupling or coupling plan, and clicking the locomotive decoupling or coupling operation sequence by means of the track occupancy display terminal to display a route preview of a corresponding station;

Step S3: after the route preview appears, sending a shunting route to be handled to an autonomous machine, and checking whether there is a conflict between the autonomous machine and the train plan; if not, sending route information to an interlocking system to be executed; if so, modifying a shunting plan, or handling the shunting route after the train route is executed; and Step S4: sending approved shunting route information to the interlocking system through the autonomous machine, and completing route shunting by the interlocking system.

2. The CTC3.0-based locomotive decoupling and coupling plan automatic generation and execution method according to claim 1, wherein the Step S1 specifically comprises the following sub-steps:

Step S101: issuing a center train stage plan to the station through a CTC working diagram;

Step S102: receiving, by the track occupancy display terminal, the stage plan issued by a center server;

Step S103: determining, by the track occupancy display terminal, whether the train plan is a passing-by plan according to the received stage plan; if the train plan is the passing-by plan, not generating a locomotive decoupling or coupling shunting plan; if the train plan is a final destination plan, a starting plan or a starting-by-time plan, checking, by the track occupancy display terminal, whether a train exists in a basic locomotive diagram; if so, performing S104; otherwise, ending the process;

Step S104: in the case where the train plan is not the passing-by plan, if it is checked by the track occupancy display terminal that the train exists in the basic locomotive diagram, defining a decoupling or coupling type of the train according to the basic locomotive diagram, and automatically generating a corresponding decoupling or coupling plan; if it is checked by the track occupancy display terminal that the train does not exist in the basic locomotive diagram, not generating a locomotive decoupling or coupling plan;

Step S105: if the train in the basic locomotive diagram is of the decoupling type, automatically generating a locomotive decoupling plan according to the train plan and the basic locomotive diagram, and automatically generating a shunting route sequence in combination with a shunting configuration;

Step S106: clicking the shunting route sequence by means of the track occupancy display terminal to handle a shunting route for locomotive decoupling;

Step S107: if the train in the basic locomotive diagram is of a coupling type, automatically generating a locomotive coupling plan according to the train plan and the basic locomotive diagram, and automatically generating a shunting route sequence in combination with a shunting configuration; and Step S108: clicking the shunting route sequence by means of the track occupancy display terminal to handle a shunting route for locomotive coupling.

3. The CTC3.0-based locomotive decoupling and coupling plan automatic generation and execution method according to claim 2, wherein the Step S102 specifically comprises: issuing, by a center plan, the stage plan to the autonomous machine of the station, and transmitting, by the autonomous machine of the station, the stage plan to the track occupancy display terminal.

4. The CTC3.0-based locomotive decoupling and coupling plan automatic generation and execution method according to claim 2, wherein the basic locomotive diagram in the Step S104 comprises store a train number, a decoupling or coupling attribute of the train, a route passed by, and target entry or exit track information, and the stored train number is consistent with the number of a train to be subjected to locomotive decoupling or coupling in the train plan.

5. The CTC3.0-based locomotive decoupling and coupling plan automatic generation and execution method according to claim 4, wherein the basic locomotive diagram is maintained through a data platform; when a locomotive to be decoupled or coupled changes, the basic locomotive diagram is updated to the track occupancy display terminal, and a new locomotive decoupling or coupling plan is automatically generated in a system.

6. The CTC3.0-based locomotive decoupling and coupling plan automatic generation and execution method according to claim 2, wherein the shunting configuration in the Step S105 is maintained through a data platform, and the track occupancy display terminal generates the shunting route for locomotive decoupling by means of the decoupling shunting plan and the shunting configuration.

7. The CTC3.0-based locomotive decoupling and coupling plan automatic generation and execution method according to claim 2, wherein the shunting configuration in the Step S105 is maintained through the data platform, and the track occupancy display terminal generates the shunting route for locomotive coupling by means of the coupling shunting plan and the shunting configuration.

8. The CTC3.0-based locomotive decoupling and coupling plan automatic generation and execution method according to claim 1, wherein in the Step S2, the route preview is displayed by reading CAD data of the station through the track occupancy display terminal, displaying a static station image, and then displaying a white light strip composed of devices corresponding to the route to be handled according to the received decoupling or computing route information and station devices included by each route in a route table.

9. The CTC3.0-based locomotive decoupling and coupling plan automatic generation and execution method according to claim 1, wherein the conflict check in the Step S3 is existing safety check of CTC3.0; if the autonomous machine and the train plan pass the conflict check, a train route and the shunting route are parallel routes, and the shunting route is handled directly; and if the autonomous machine and the train plan fail to pass the conflict check, the shunting route will not be handled.

10. An electronic device, comprising a memory having a computer program stored therein, and a processor, wherein the processor executes the computer program to implement the method according to claim 1.

* * * * *